United States Patent [19]

Rumford et al.

[11] Patent Number: 4,783,026
[45] Date of Patent: Nov. 8, 1988

[54] ANTI-ICING MANAGEMENT SYSTEM

[75] Inventors: Kimball J. Rumford, Fairfield; Richard M. Norris, Stratford, both of Conn.

[73] Assignee: Avco Corporation, Providence, R.I.

[21] Appl. No.: 53,254

[22] Filed: May 22, 1987

[51] Int. Cl.⁴ .................. B64D 15/04; B64D 15/22
[52] U.S. Cl. .................. 244/134 R; 244/134 F; 244/134 B; 60/39.093
[58] Field of Search .......... 244/134 R, 134 B, 134 F; 60/39.093

[56] References Cited

U.S. PATENT DOCUMENTS

| | | |
|---|---|---|
| 2,507,044 | 5/1950 | Palmatier . |
| 2,663,522 | 12/1953 | Lawrence . |
| 2,663,993 | 12/1953 | Mosser .............................. 60/39.093 |
| 2,711,453 | 6/1955 | Leigh, Jr. ........................ 244/134 B |
| 2,747,365 | 5/1956 | Rainbow ........................ 60/39.093 |
| 2,868,483 | 1/1959 | Krueger . |
| 3,123,283 | 3/1964 | Leis ................................ 60/39.093 |
| 3,517,900 | 6/1970 | Roussel .......................... 244/134 F |
| 3,720,388 | 3/1973 | Kaatz et al. . |
| 3,981,466 | 9/1976 | Shah . |
| 4,047,379 | 9/1977 | Brooks et al. .................. 60/39.093 |
| 4,292,502 | 9/1981 | Adams . |
| 4,410,794 | 10/1983 | Williams . |
| 4,470,123 | 9/1984 | Magenheim et al. . |

*Primary Examiner*—Joseph F. Peters, Jr.
*Assistant Examiner*—Rodney Corl
*Attorney, Agent, or Firm*—Perman & Green

[57] ABSTRACT

An anti-icing management system for a gas turbine engine according to which, at all times, only the required amount of heat is applied to inlet surfaces of the engine to prevent the formation of ice. Heated air is bled from the compressor discharge, or from some other suitable heat source, for this purpose. The amount of flow of the heated air is adjusted by an electronic control responsive to the temperature of the anti-iced engine inlet surfaces directly in the path of incoming air. The electronic control may be effective to admit flow of the heated air to the region to be heated when a separate ice detector determines the presence of ice and so informs the control.

12 Claims, 3 Drawing Sheets

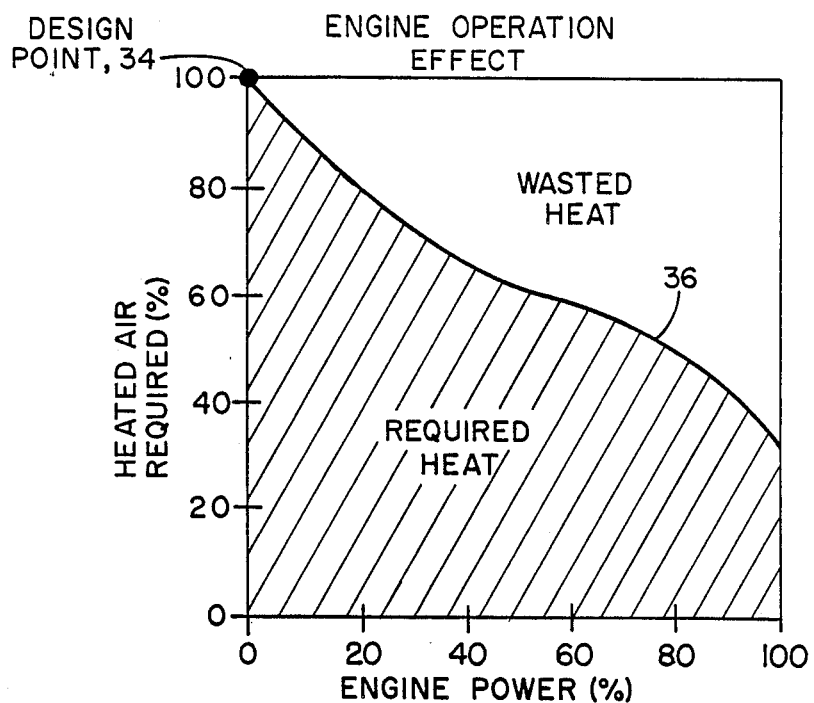
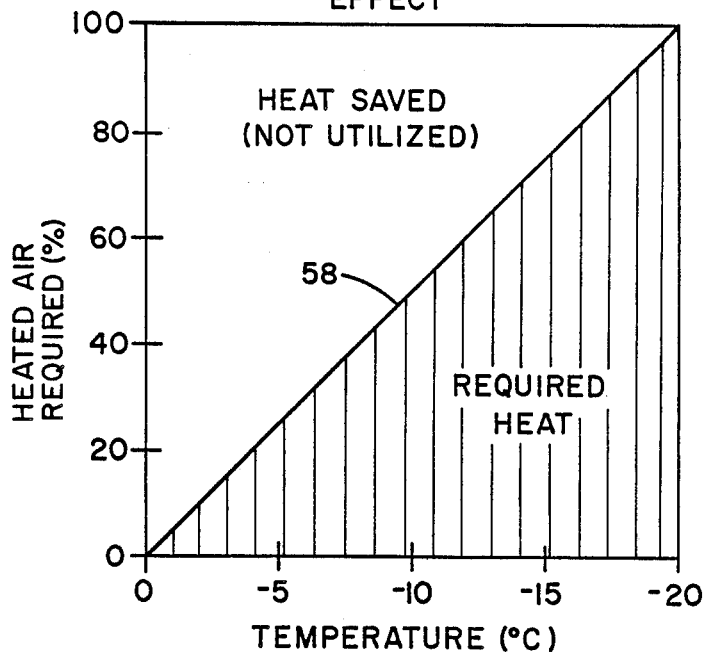

4,783,026

ANTI-ICING MANAGEMENT SYSTEM

BACKGROUND OF THE INVENTION

The present invention relates generally to an anti-icing mangement system for a gas turbine engine and, more particulary, to such a system whcih provides on an as-required basis, only the necessary amount of heat to prevent the formation of ice at the engine inlet.

It is common in modern gas turbine powered aircraft to find systems which perform a thermal anti-icing function utilizing hot, compressed air from the discharge region of the engine compressor called "bleed air." In such aircraft, a portion of the total engine bleed air available is routed to the various engine components which are subjected to icing and then exhausted overboard.

For purposes of describing the present invention, it will be understood that the term "anti-icing" refers to the prevention of the formation of ice in the first place whereas the term "de-icing" refers to the reduction, or elimination, of ice after it has begun to form. It will be understood that although the term "anti-icing" is consistently used throughout the disclosure, the invention is not to be so limited, but is applicable to de-icing systems as well.

Historically, helicopters have had limited operational capability in icing environments due to their susceptibility to rotor blade icing. Military strategists present numerous scenarios of possible future conflicts involving helicopters in temperate and arctic regions. In these instances, engagement would likely occur in poor weather conditions that are conducive to icing environments, and helicopter mission performance under such conditions could be decisive. Recognizing this fact, the next generation of smaller helicopters will require all-weather capability and will be equipped with rotor blade deicing systems. As power requirements for rotor blade de-icing are large, research has been directed towards minimizing these requirements using an efficient management control system. However, the need for similar engine anti-icing management systems has been largely overlooked.

High efficiency engines are generally more sensitive to off design operating conditions produced by compressor bleed air anti-icing systems and, without careful bleed air management, can severely penalize engine performance. For example, an advanced technology helicopter turboshaft engine, equipped with an inlet particle separator, requiring 2.5 percent compressor bleed for the critical anti-icing design point, will realize engine performance penalties of 4 to 5 percent SFC (specific fuel consumption) increase, 7.5 to 10 percent power loss, and 40° C. increase in turbine gas temperature. These values exceed the power and SFC requirements established by military specifcations for anti-icing operation. The cumulative operational effect is a reduction in mission capability and engine life.

Conventional engine anti-icing systems are very wasteful of compressor air bleed heating because operation is set for the most severe anti-icing design point condition even when a less severe or no icing condition is encountered. preliminary analysis on the accumulative effect of such factors as the probability of encountering icing in clouds, and operating at higher ambient temperatures and engine power conditions than the critical anti-icing design point (e.g. typically −20° C. and idle conditions) indicate that only 5 percent of the total bleed energy is being effectively used. 8tated another way, when using a conventional engine bleed anti-icing system, 95 percent of the bleed energy can be wasted. Thus, the engine must work harder at higher turbine temperatures resulting in decreased engine life.

To achieve an energy efficient anti-icing bleed management system, it is only necessary to produce sufficient heating to maintain critical inlet surface temperatures above the water freezing temperature when encountering meteorological icing conditions.

Current ice protection systems, particularly antiicing systems for helicopter engines, are not managed for efficient optimization and as a result can adversely impact mission performance and operation. Such systems for helicopter engines, e.g., T53, T55, T58, T64, LT101, and the like, use a compressor hot air bleed source to heat critical engine inlet surfaces. The pilot actuates a simple on/off bleed valve when encountering potential icing conditions, i.e., typically at ambient temperatures below 5° C. in the presence of visible moisture (i.e., a cloud). The bleed valve is designed for a fail safe 'on' condition. This system provides a convenient, dependable heating source in a compact package. However, it is exceedingly energy inefficient.

This inefficiency is due to a number of factors. For example, anti-icing bleed may be actuated by the pilot even when no icing is encountered but merely because the presence of clouds make it appear as being likely to the pilot. Also, excessive bleed energy is consumed when operating above a critical meteorological design anti-icing point, e. g. ambient temperature, To equal to −20° C. Still another factor causing the inefficiency is that excessive bleed energy is consumed when operating the engine above a critical anti-icing design point chosen for that particular engine, generally during idle operation.

Typical of the prior art relating generally to the field of the present invention is the U.S. Pat. No. 2,868,483 issued Jan. 13, 1959 to Krueger which discloses the use of a closed-loop anti-icing system which utilizes heated air extracted from the compressor manifolds of a gas turbine engine. Both the temperature and pressure of air flowing through the wing ducts are monitored. In the event prestablished limits are exceeded, a dump vent may be actuated or the flow of heated air restricted, but in neither instance with any concern for economy of the operation.

The more recent U.S. Pat. No. 4,410,794 issued Oct. 18, 1983 to Williams discloses the use of a microprocessor in combination with a de-icing system for the rotor blades of a helicopter. A system for indicating ice thickness and rate of ice thickness growth also utilizing a microprocessor is disclosed in U.S. Pat. No. 4,470,123 issued Sept. 4, 1984 to Magenheim et al. Again, neither Williams nor Magenheim et al disclose or are concerned in any way with economy of operation.

SUMMARY OF THE INVENTION

It was with knowledge of the state of the art in general and of the foregoing problems in particular that the present system was conceived and has now been reduced to practice.

To this end, an anti-icing management system for a gas turbine engine is provided according to which, at all times, only the required amount of heat is applied to inlet surfaces of the engine to prevent the formation of ice. Heated air is bled from the compressor discharge, or from some other suitable heat source, for this purpose. The amount of flow of the heated air is adjusted by an electronic control responsive to the temperature of the anti-iced engine inlet surfaces directly in the path of the incoming air. The electronic control may be effective to admit flow of the heated air to the region to be heated when a separate ice detector determines the presence of ice producing conditions and so informs the control.

To achieve an effective anti-icing system, it is only necessary to produce sufficient heating to maintain critical inlet surface temperatures above the water freezing temperature when encountering meterological icing conditions. For such an energy efficient solution, a simple automatic 'on demand' system activated by an ice detector and regulated thermostatically is provided. The system includes a fully modulating anti-icing bleed value activated by a temperature sensor monitoring critical engine inlet surfaces which are to remain ice free. A logic controller (for example, a microprocessor) is recommended to ensure satisfactory automatic control adjustment for engine system peculiarities, off-design operating conditions, and for back up failure mode functions.

An engine anti-icing management system, based on automatically optimizing typical conventional systems thus allows the realization of numerous benefits compared with current systems. These benefits include: typically 5 percent less fuel consumption for mission in icing conditions; enhanced engine power and operational capabilities; and increased engine life.

Other and further features objects advantages, and benefits of the invention will become apparent from the following description taken in conjunction with the following drawings. It is to be understood that both the foregoing general description and the following detailed description are exemplary and explanatory but not restrictive of the invention. The accompanying drawings which are incorporated in and constitute a part of this invention, illustrate some of the embodiments of the invention and, together with the description, serve to explain the principles of the invention in general terms. Like numerals refer to like parts throughout the disclosure.

BRIEF DESCRIPTION OF THE DRAWINGS

FIGS. 2A, 2B, and 2C are graphs which depict the operations and deficiencies of prior art systems,; and FIG. 3 is a graph which depicts the operation and benefits of the the anti-icing system embodying the invention.

DETAILED DESCRIPTION OF THE PREFERRED EMBODIMENTS

Figure 1:
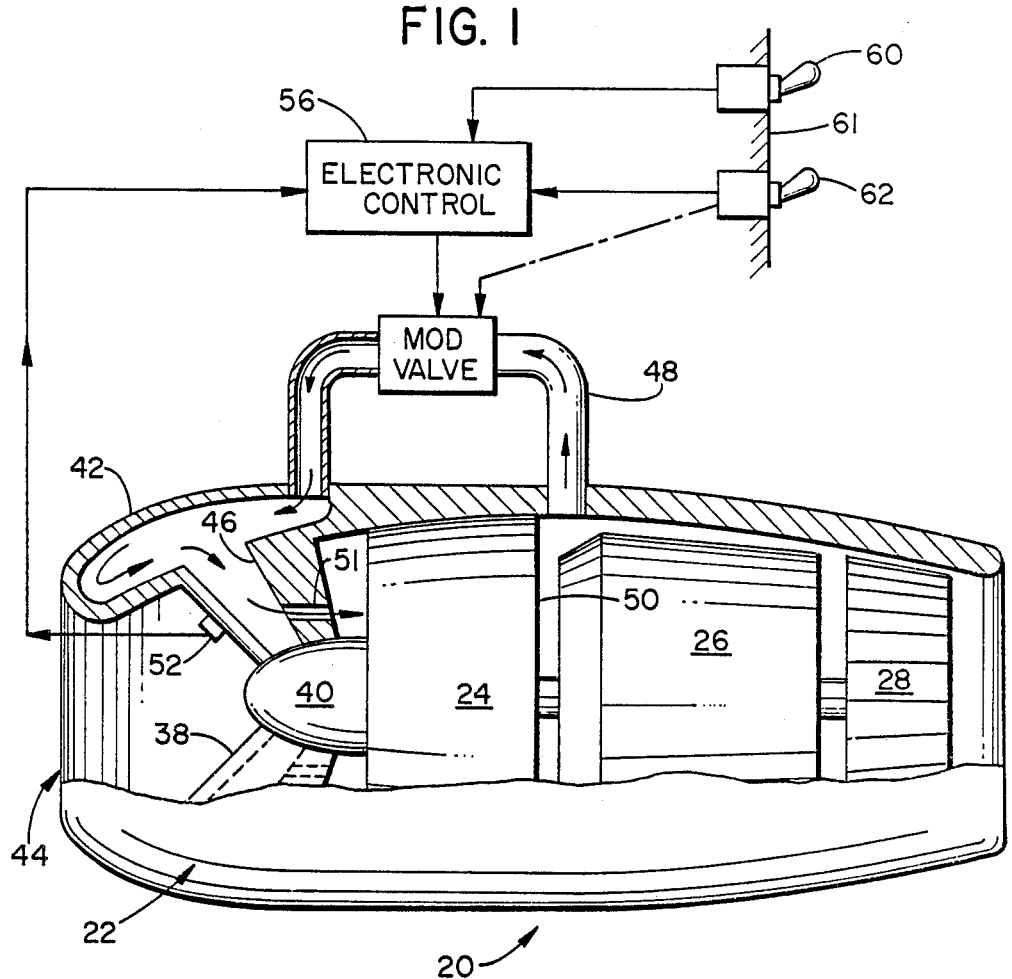
FIG. 1 is a diagrammatic view of an anti-icing management system embodying the invention.

Turn now to the drawings and, initially, to FIG. 1 which is a diagrammatic representation of an anti-icing management system 20 embodying the invention. The system 20 has application to a gas turbine engine 22, generally of a small to medium size, and of a type normally used to power helicopters. Engines of this class typically handle a mass flow of 10 pounds of air per second or less. In a customary fashion, the gas turbine engine 22 includes a compressor 24, a combustor 26, and an output turbine 28.

Figure 2:
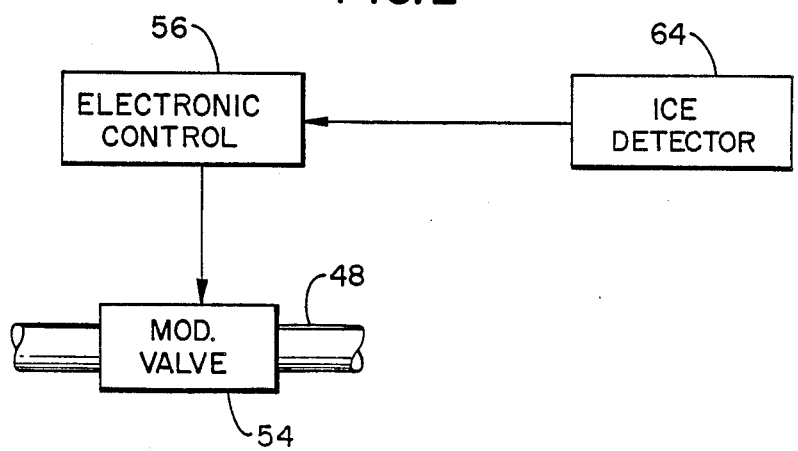
FIG. 2 is a detail diagrammatic view of an anti-icing system modified from the system of FIG. 1.
Figure 2A:
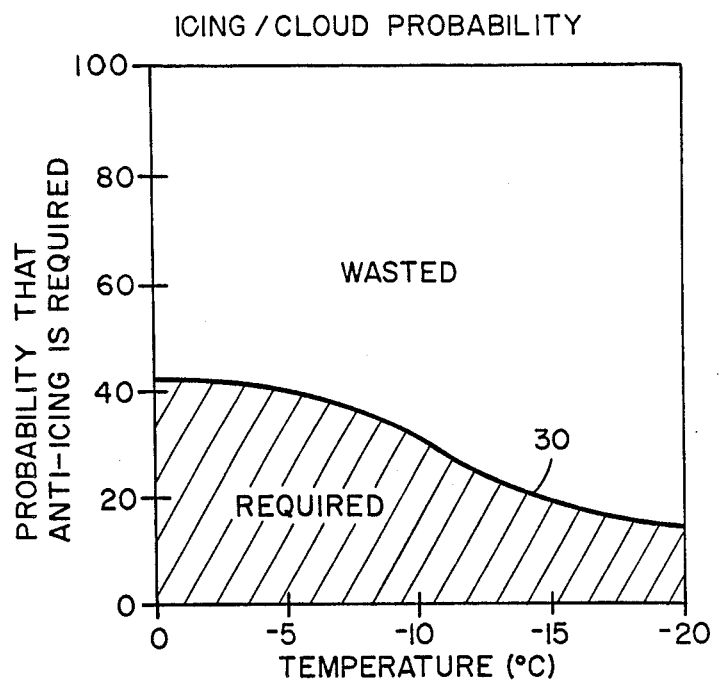

It was previously mentioned that conventional antiicing systems for helicopter engines are exceedingly energy inefficient. Three primary factors were enumerated. A first of these factors is depicted in FIG. 2A and presents the probability that the operation of the anti-icing system is required. As previously explained, the pilot customarily actuates a simple on-off bleed valve when encountering potential icing conditions which occur typically at ambient temperatures below 5° C. in the presence of visible moisture, that is, a cloud. This assessment on the part of a pilot is not always correct and the graph depicted in FIG. 2A indicates the substantial amount of heat which is wasted as a result, specifically that area lying above a curve 30 therein.

Figure 2B:
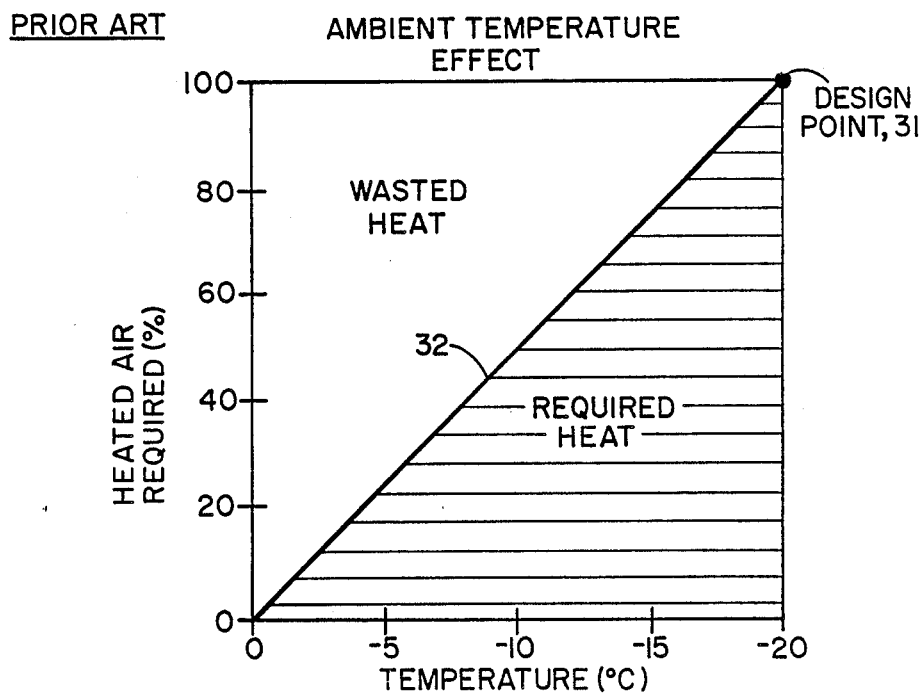

Another of the factors causing inefficiency in conventional on-off anti-icing systems is depicted in FIG. 2B. As seen therein, the engine is designed to assure its proper operation above a critical meteorological design anti-icing point represented by a reference numeral 31. Such a point is arbitrarily, albeit intelligently, chosen, for example, an ambient temperature of minus 20° C. Since there is generally no major concern that icing will occur above 0° C., it will be appreciated that any heat represented as lying above a curve 32 in FIG. 2B will be wasted, that heat represented as lying below the curve 32 being all that is required at any given temperature.

Still another factor causing inefficiency of the type with which the invention is concerned is referred to as the "engine operating effect", and is depicted in FIG. 2C. This means that, for a conventional on-off anti-icing system, excessive bleed energy is consumed when operating an engine above its critical anti-icing design point, which generally occurs during idle operation. A design point, represented by a reference numeral 34, assures that 100 percent of heated air is available for anti-icing purposes when the engine is merely idling. As engine power increases, however, it will be appreciated that bleed temperature increases with the result that the gross amount of bleed air can be reduced while yet achieving the same anti-icing result. However, since conventional anti-icing systems utilized in engines within the size range with which the present invention is concerned, are operated continuously at the design point 34, it will be appreciated, with reference to FIG. 2C, that all quantities of heated air represented as lying above a curve 36 in that graph is wasted and therefore detracts from the performance of the engine.

While systems have been devised to enable operation along the curve 36, they are not readily adaptable to the class of engines with which the invention concerned without significantly adding to the cost and complexity of the engine. By way of example, the General Electric Model T700 is a current, successful, state-of-the-art engine which utilizes such a sophisticated system. Its drawback is that the anti-icing system which it employs is a complex arrangement of mechanical actuators and linkages by means of which the fuel control operates an anti-icing valve to control the flow of anti-icing air. Assembly costs are high as a result, more items are subject to failure, and frequent, time-consuming, maintenance is a necessity.

Table I indicates that the accumulative effect of the three factors depicted in FIGS. 2A, 2B, and 2C results in ten percent of the total bleed energy being effectively used when the engine is operating in the idle mode and only four percent of the total bleed energy being effectively used when the engine is in the maximum power mode.

TABLE I

CONVENTIONAL ENGINE ANTI-ICING BLEED SYSTEMS ANALYSIS OF MINIMUM BLEED CONSUMPTION FOR EFFECTIVE ANTI-ICING OPERATION

System: - on/off valve, engine compressor bleed heating, fixed bleed geometry
Critical Design Point: - Ambient Temperature −20° C. Flight Idle Engine Operation

|  | Ambient Temperatures | |
|---|---|---|
|  | 5° C. | 20° C. |
| (a) Probability of encountering icing conditions in clouds* | 40% | 10% |
| (b) Percent bleed requirement of temperature design point 0° C. - $T_o$ (Actual) 0° C. - $T_o$ (Design) where $T_o$ = ambient temp. | 25% | 100% |

|  | Engine Condition | |
|---|---|---|
|  | Flight Idle | Max. Power |
| (c) Percent bleed requirement of engine condition design point 0° C. − $T_{BL}$ (Design) 0° C. − $T_{BL}$ (Actual) where $T_{BL}$ = bleed air temp. ACCUMULATIVE EFFECT Minimum bleed energy consumption for effective anti-icing (a) × (b) × (c) | 100% 10% | 40% 4% |

*Ottawa NRC Report LR-3344, "Review of Icing Detection for Helicopters", by J. R. Stallabrass, March 1962.

High-efficiency engines are generally more sensitive to off-design operating conditions produced by anti-icing bleed operation. Therefore, engine compressor bleed air for the purpose of anti-icing heating, without proper bleed management, is an inefficient method. Typical performance characteristics for an advanced technology engine indicate that every one percent of compressor discharge bleed air results in penalties which include: a 1.5 to 2.0 percent specific fuel consumption (SFC) increase; a 3.0 to 4.0 percent power loss (for high power limits); and a 1.0 percent increase in turbine temperature (25° C. at high power). Typical anti-icing bleed requirements for a turbo-shaft engine fitted with an inlet particle separator is 2 to 3 percent. Thus, engine performance penalties will be increased proportionally.

Return now, once again, to FIG. 1. The gas turbine engine 22 is provided, in customary fashion, with a pair of inlet struts 38 which support a streamlined centerbody 40 spaced from a forward extremity of an inlet cowling 42 defining an inlet 44 into the gas turbine engine 22. The centerbody 40 is positioned immediately forward of the compressor 24. The inlet struts 38, the centerbody 40, and the inlet cowling 42 define structure located at the inlet of the engine 22 which has surfaces on which ice can undesirably form. The ice can adversely effect the flow of air into the engine and, if it dislodges from the surfaces, would be drawn through the engine and can cause serious damage.

As seen in FIG. 1, the inlet struts 38 and the inlet cowling 42 define air ducting 46 therein for receiving flow therethrough of heated air to thereby prevent the formation of ice on the outer surfaces. Although, for purposes of simplicity, the centerbody 40 is not illustrated as being provided with such air ducting, it is within the scope of the invention for the centerbody to be so constructed as well. A passage 48 is suitably provided in the system 20 to direct flow of heated air from a discharge side 50 of the compressor 24 to the air ducting 46 within the structural elements located at the inlet 44 to the gas turbine engine 22. Each inlet strut 38 is provided with an exhaust passage 51 which may exhaust into the compressor 24, or preferably, in some manner, completely away from the engine 22. The exhaust passage 51 assures continuous flow of heated air from the discharge side 50 of the compressor 24, through the passage 48 and then through the air ducting 46.

In this manner, the heated air is continuously supplied to the air ducting 46 so long as the valve 54 remains open. Pressure differences between the compressor discharge side 50 and the exhaust passage 51 are generally adequate to maintain flow through the passage 48. Although it has been described that the source of heated air is the discharge side 50 of the compressor 24, it will be understood that the heated air can be taken from other suitable locations within the engine 22. For example, compressor interstage bleed air, turbine interstage bleed air, or engine exhaust bleed air would all be appropriate for anti-icing purposes.

A temperature sensor 52 of any suitable type, such as Model 1122621 manufactured by Lewis Engineering of Waterbury, Conn. is mounted on the outer surface of one of the inlet struts 38 directly in the path of incoming air. The temperature sensor 52 serves to detect the temperature of the surface on which it is mounted and generates a signal proportional thereto. While the sensor 52 is depicted as being mounted on an inlet strut 38, it may just as properly be mounted on the centerbody 40 or, indeed, on any forwardly facing surface directly subject to flow of air through the inlet 44.

A modulated valve 54 is mounted in the passage 48 to adjust flow of all of the heated air passing therethrough. The valve 54 may be a electrically operated valve, such as Part No. 81275 manufactured by Consolidated Controls of Los Angeles, Calif. and selectively operable for incremental movement between a fully opened position to enable maximum flow of heated air through the passage 48 into the air ducting 46 and a closed position to prevent any flow therethrough at all and an infinite number of intermediate positions. The valve 54 is operated in response to a signal from an electronic control 56 which may be of the type referred to as "FADEC" (Full Authority Digital Engine Control), one suitable control for purposes of the invention being model EMC-32 manufactured by Chandler-Evans Corporation of Hartford, Conn.

In accordance with the invention, the electronic control 56 is programmed to respond, when the temperature sensed by the sensor 52 falls to a predetermined temperature, for example, 0° C., to begin opening the valve 54. In one instance, the electronic control 56 may be so programmed as to open the valve 54 to its full opened position at any time that the temperature sensor 52 detects a temperature at or below the predetermined temperature. In another instance, the electronic control may open the valve 54 in proportion to the temperature detected by the sensor 52.

The effect of managing the flow of heated bleed air to the air ducting 46 by means of the electronic control 56 can be readily seen in FIG. 3. Specifically, the flow rate of heated bleed air is carefully monitored to follow a curve 58. In this manner, only so much heated air as required, and as represented as lying below the curve 58, is directed to the air passage 48, and no more. Thus, whereas the area above curve 32 in similar FIG. 2B represents wasted bleed air, the area above curve 58 in FIG. 3 represents heated air not utilized and therefore saved. The benefits which result from this saving include improved engine performance, decreased fuel consumption, lowered turbine temperatures, and increased engine life.

The operation of the electronic control 56 is also such that in the event of its failure, the valve 54 would remain open in order to assure that there would always be adequate heated air to prevent the formation of ice on the external surfaces at the inlet 44 to the engine 22. Additionally, provision may be made for the pilot of an aircraft into which the system 20 has been incorporated to be able to choose whether the system is activated or not. For this purpose, as diagrammatically illustrated in FIG. 1, a switch 60 may be provided on an instrument panel 61 of the aircraft enabling the pilot to arbitrarily activate or deactivate the control 56. Thus, on a cold clear day, the pilot may elect to deactivate the system, but should clouds develop, he would then reactivate the system.

The invention also recognizes that there are times when the pilot has need to override the system. Thus, as diagrammatically illustrated in FIG. 1, an override switch 62 may also be suitably mounted on the instrument panel 61 for arbitrarily deactivating the electronic control 56, if it is not already deactivated, and enabling direct manual operation of the valve 54, moving it as necessary either to its fully open position or to its fully closed position.

In another embodiment of the system 20 as just described, an ice detector 64 (FIG. 2) may be provided to sense the presence of ice producing conditions. To this end, the ice detector may be located within the inlet 44 to the engine 22 or it may be located elsewhere on the fuselage or on an air foil of the aircraft or at some other appropriate location. An ice detector unit suitable for use with the present invention may be that known as Part Number 126260 manufactured by the Avionics division of Leigh Instruments Limited of Carleton Place, Ontario, Canada.

As utilized in the system 20, the ice detector 60 generates a signal in the event that it senses the presence of an ice producing condition and so informs the electronic control 56. The control 56 is thereby activated, if it had not previously been activated, and utilizes the input so received from the ice detector to aid in its pre-programmed decision making process for operating the valve 54.

While the preferred embodiments of the invention have been disclosed in detail, it should be understood by those skilled in the art that various modifications may be made to the illustrated embodiments without departing from the scope as described in the specification and defined in the appended claims.

What is claimed is:

1. An anti-icing management system for a gas turbine engine including a compressor, a combustor, and a turbine, comprising:
   structural means at the inlet of the gas turbine engine having an outer surface and air ducting therein for receiving flow therethrough of heated air to thereby prevent the formation of ice on said outer surface;
   a source of heated air;
   passage means enabling the flow of heated air from said source to said air ducting;
   temperature sensor means on said outer surface directly in the path of incoming air for detecting the temperature of said outer surface and generating a signal proportional thereto;
   modulated valve means in said passage means operable for incremental movement between fully open and fully closed positions for regulating the flow of heated air therethrough between said source and said air ducting according to the temperature of said outer surface; and
   control means responsive to the signal from said temperature sensor means when the temperature of said outer surface falls to or below a predetermined value for continuously, incrementally operating said valve means as a function of the temperature of said outer surface to thereby provide only the required amount of heat to said structural means to prevent the formation of ice on said outer surface.

2. An anti-icing managment system as set forth in claim 1 including:
   means for selectively activating said control means.

3. An anti-icing management system as set forth in claim 2
   wherein said means for selectively activating said control means includes an ice detector for sensing the presence of an ice producing condition and responsive to the presence of an ice producing condition for generating a signal and for transmitting the signal to said control means.

4. An anti-icing management system as set forth in claim 2
   wherein said means for selectively activating said control means includes a manually operable switch.

5. An anti-icing management system as set forth in claim 1
   wherein said valve means is an electrically operated modulated valve.

6. An anti-icing management system as set forth in claim 1
   wherein said source of heated air is at least one of compressor discharge bleed air, compressor interstage bleed air, turbine interstage bleed air, or engine exhaust bleed air.

7. An anti-icing management system as set forth in claim 1
   wherein said structural means at the inlet of the gas turbine engine includes outlet means for exhausting the heated air from said air ducting.

8. An anti-icing management system as set forth in claim 1 including:
   manual override means for selectively operating said valve means and simultaneously rendering said control means ineffective for operating said valve means.

9. In an aircraft powered by a gas turbine engine, an anti-icing management system for the gas turbine engine comprising:
   structural means at the inlet of the gas turbine engine having an outer surface and air ducting therein for receiving flow therethrough of heated air to thereby prevent the formation of ice on said outer surface;
   a source of heated air;
   passage means enabling the flow of heated air from said source to said air ducting;
   temperature sensor means on said outer surface directly in the path of incoming air for detecting the temperature of said outer surface and generating a signal proportional thereto;

modulated valve means in said passage means operable for incremental movement between open and closed positions for regulating the flow of heated air therethrough between said source and said air ducting according to the temperature of said outer surface; and control means responsive to the signal from said temperature sensor means when the temperature of said outer surface falls to or below a predetermined value for continuously, incrementally operating said valve means as a function of the temperature of said outer surface to thereby provide only the required amount of heat to said structural means to prevent the formation of ice on said outer surface.

10. An anti-icing management system as set forth in claim 9 including:

an ice detector for detecting the presence of an ice producing condition and responsive to the presence of an ice producing condition for generating a signal and for transmitting the signal to said control means.

11. An anti-icing management system as set forth in claim 9 including:

switch means for manually activating said control means.

12. An anti-icing management system as set forth in claim 9 including:

manual override means for selectively operating said valve means and simultaneously rendering said control means ineffective for operating said valve means.

* * * * *